(12) United States Patent
Lynch

(10) Patent No.: US 10,958,046 B2
(45) Date of Patent: Mar. 23, 2021

(54) DOUBLE WALLED HIGH VOLTAGE INSULATOR COVER FOR MITIGATING LEAKAGE CURRENT

(71) Applicant: Eco Electrical Systems, Reno, NV (US)

(72) Inventor: Michael Lynch, Reno, NV (US)

(73) Assignee: Eco Electrical Systems, Reno, NV (US)

( * ) Notice: Subject to any disclaimer, the term of this patent is extended or adjusted under 35 U.S.C. 154(b) by 240 days.

(21) Appl. No.: 16/214,695

(22) Filed: Dec. 10, 2018

(65) Prior Publication Data

US 2020/0185890 A1    Jun. 11, 2020

(51) Int. Cl.
*H02B 1/06* (2006.01)
*H01H 9/02* (2006.01)
*H01H 31/00* (2006.01)

(52) U.S. Cl.
CPC ............. *H02B 1/06* (2013.01); *H01H 9/0264* (2013.01); *H01H 31/006* (2013.01)

(58) Field of Classification Search
CPC . H02G 7/00; H02G 1/02; H01B 17/00; H01B 19/00; H01B 17/005; H01B 17/56; H01B 17/26; H01B 7/00; H01B 1/06; H01F 27/02; H05K 5/03; H01R 4/70; H02B 1/06; H01H 31/00; H01H 9/02; H01H 9/0264; H01H 31/006; H01H 85/185; H01H 21/165; H01H 31/122; H01H 31/127
USPC ......... 174/152 G, 153 G, 135, 152 R, 138 R, 174/139, 138 F, 137 R, 5 R, 14 BH; 337/168, 171, 202, 403
See application file for complete search history.

(56) References Cited

U.S. PATENT DOCUMENTS

| 2,263,319 | A  | * | 11/1941 | Treanor  | H01B 17/26 174/139 |
| 7,154,034 | B2 |   | 12/2006 | Lynch    |  |
| 7,301,096 | B2 | * | 11/2007 | Strong   | H01B 17/00 174/5 R |
| 8,633,391 | B2 | * | 1/2014  | Strong   | F16B 37/14 174/138 F |
| 8,772,633 | B2 | * | 7/2014  | Behnken  | H01B 19/00 174/5 R |
| 8,957,314 | B2 | * | 2/2015  | Niles    | H02G 7/00 174/5 R |
| 9,741,476 | B2 | * | 8/2017  | Hiller   | H01B 19/00 |
| 9,960,586 | B2 | * | 5/2018  | Niles    | H02G 7/00 |
| 10,679,815 | B1 | * | 6/2020  | Lynch    | H01B 17/58 |

* cited by examiner

*Primary Examiner* — Angel R Estrada
(74) *Attorney, Agent, or Firm* — Patent Law Group; Brian D. Ogonowsky

(57) ABSTRACT

For protecting wildlife from high voltage conductors proximate to a utility pole, dielectric covers are used to cover fuse cutouts, bushings, or other connections to insulators. Such covers include a vertical slot for receiving an energized wire so the cover can be installed using a hot-stick while the wire is energized. To eliminate leakage currents flowing across the cover under high voltage conditions, which previously led to localized melting of the cover, inner walls of the cover are molded that are laterally separated from the outer walls of the cover. The double wall design eliminates leakage currents due to the extra dielectric wall and air gap, and the inner wall is not subject to contamination from conductive pollutants. The double wall design also increases the insulating properties of the cover.

20 Claims, 7 Drawing Sheets

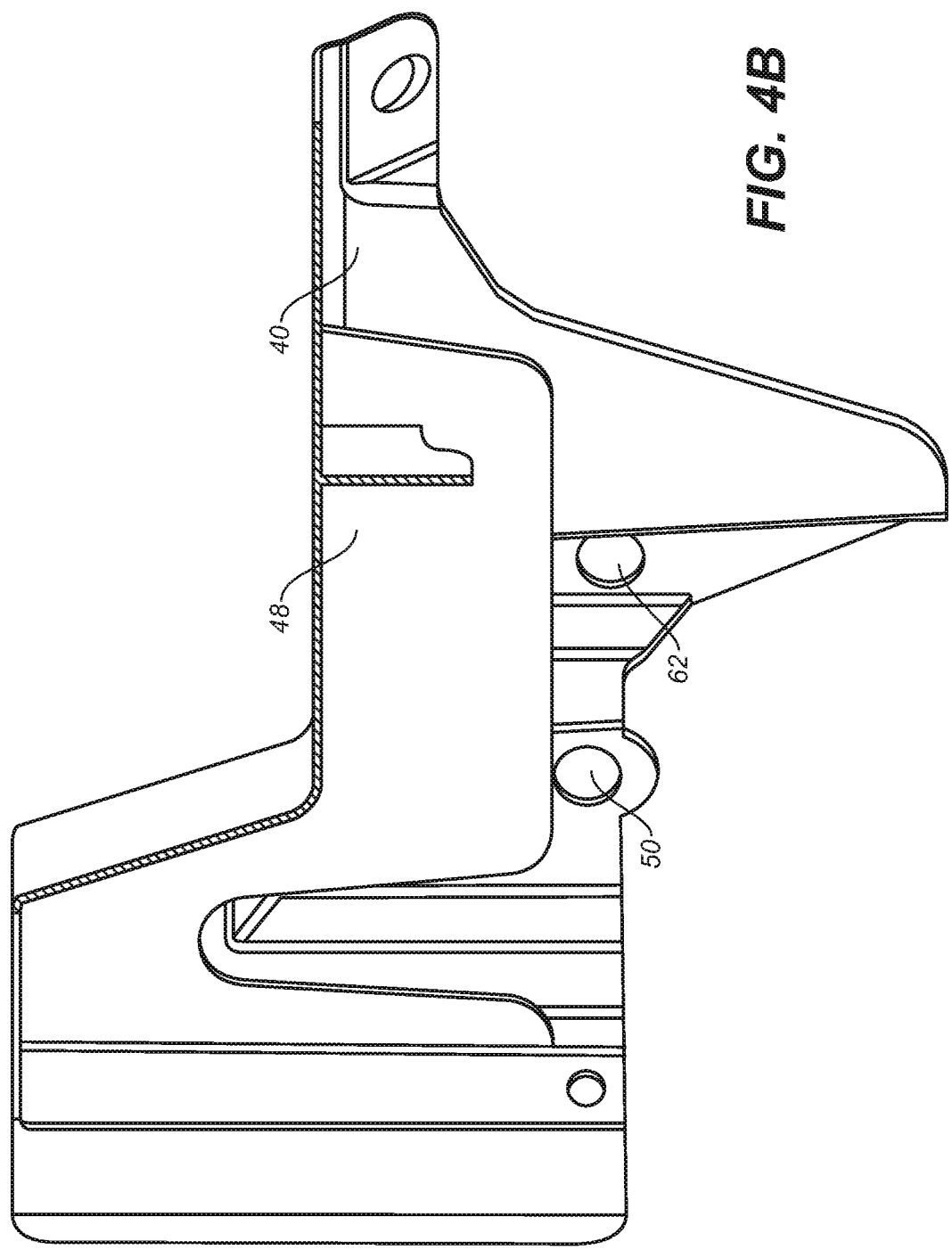

DOUBLE WALLED HIGH VOLTAGE INSULATOR COVER FOR MITIGATING LEAKAGE CURRENT

FIELD OF THE INVENTION

The invention relates to a wildlife-protection cover for a high voltage conductor, such as a cover for a fuse cutout or a bushing, and, in particular, to a double walled cover that mitigates leakage current across the cover.

BACKGROUND

Applicant's own U.S. Pat. No. 7,154,034, incorporated herein by reference, describes a dielectric fuse cutout cover. The cover protects birds and other animals from electrocution, which may also trigger an over-current condition due to electrical shorts between phases or phase to ground that may cause a power outage. Other types of dielectric covers for bushings, transformer taps, and other high voltage connections are known for preventing wildlife from electrocution.

Such cutout covers have a body that forms a single dielectric wall surrounding the cutout's metal upper contact assembly.

Applicant was informed by linemen that some cutout covers, bushing covers, lightning arrestor covers, and other types of dielectric covers for high voltage parts have developed melted portions after a period of use under high voltage conditions. Applicant surmised that the melting is due to heat generated by leakage currents flowing along the outside surface of the cover. Such melting of the cover increases the chances of a flashover due to exposed energized parts, which may cause a power outage.

Therefore, what is needed is an improved design of a cutout cover, or other cover for a high voltage component, that prevents such leakage current and melting.

SUMMARY

To eliminate leakage currents across the cutout cover under high voltage conditions, which previously led to localized melting of the cover, inner walls of the cover are molded that are laterally separated from the outer walls of the cover by an air gap.

The double wall design eliminates leakage currents due to the extra dielectric wall and air gap, and the inner wall is not subject to contamination from conductive materials, such as sea salt, pesticides, and certain types of pollution. The double wall design also increases the level of insulation provided by the cover.

The outer walls and shape of the cover have the main function of preventing wildlife from contacting any high voltage conductor. The inner walls only need to shroud the upper contact assembly of the cutout, or other components conducting a high voltage, since that area of the cover is the most prone to the localized heating by the leakage currents. Accordingly, the inner walls may only be formed within a small portion of the cover.

The improvement achieved by the double wall design applies to high voltage cutout covers, bushing covers, lightning arrestor covers, transformer connection covers, insulator connection covers, and any other cover that is proximate to an energized part.

BRIEF DESCRIPTION OF DRAWINGS

FIG. 4B is a bisected view of the cover showing a shape of one of the inner walls.

DETAILED DESCRIPTION

Figure 1:
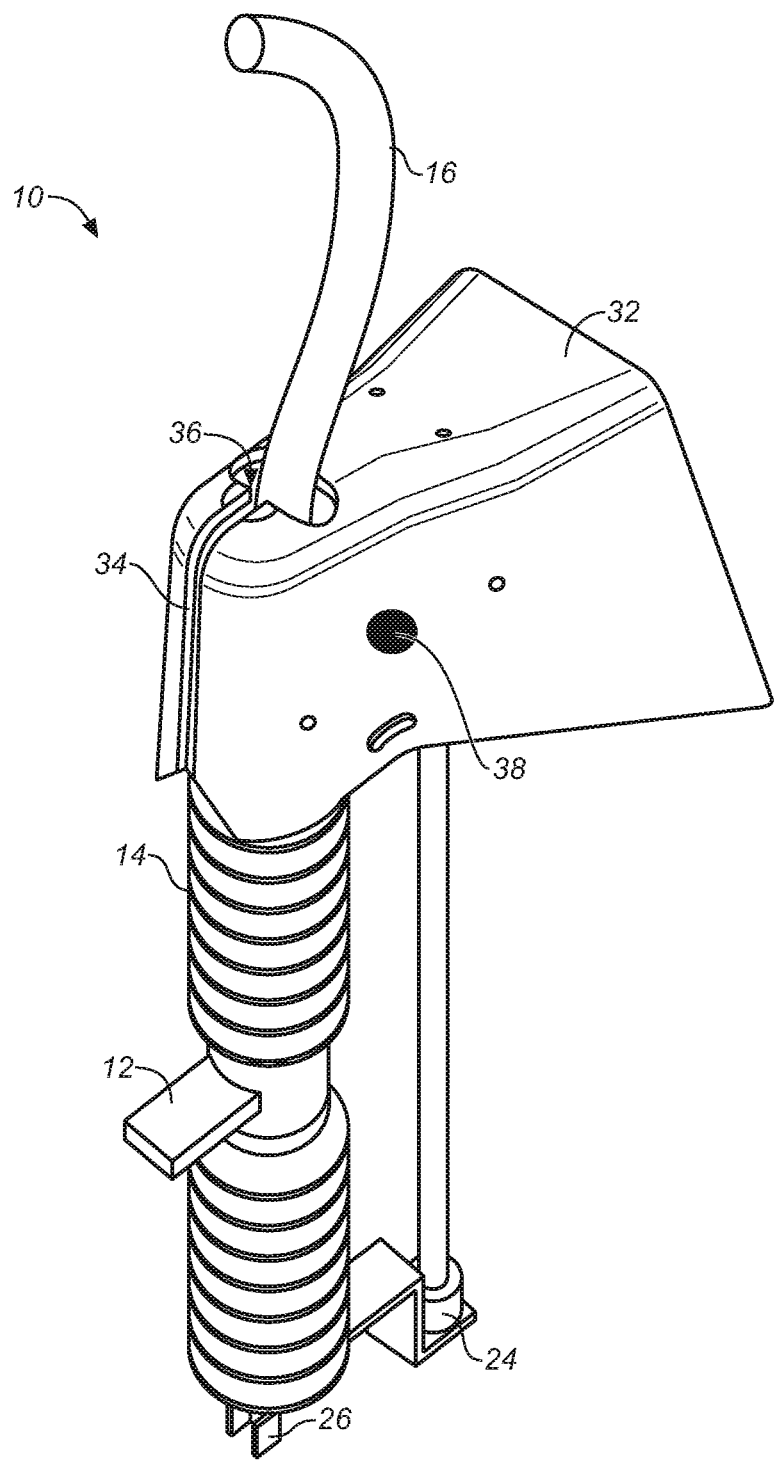
FIG. 1 is a perspective view of a prior art fuse cutout with a cover, showing a melted area due to leakage current.
Figure 2:
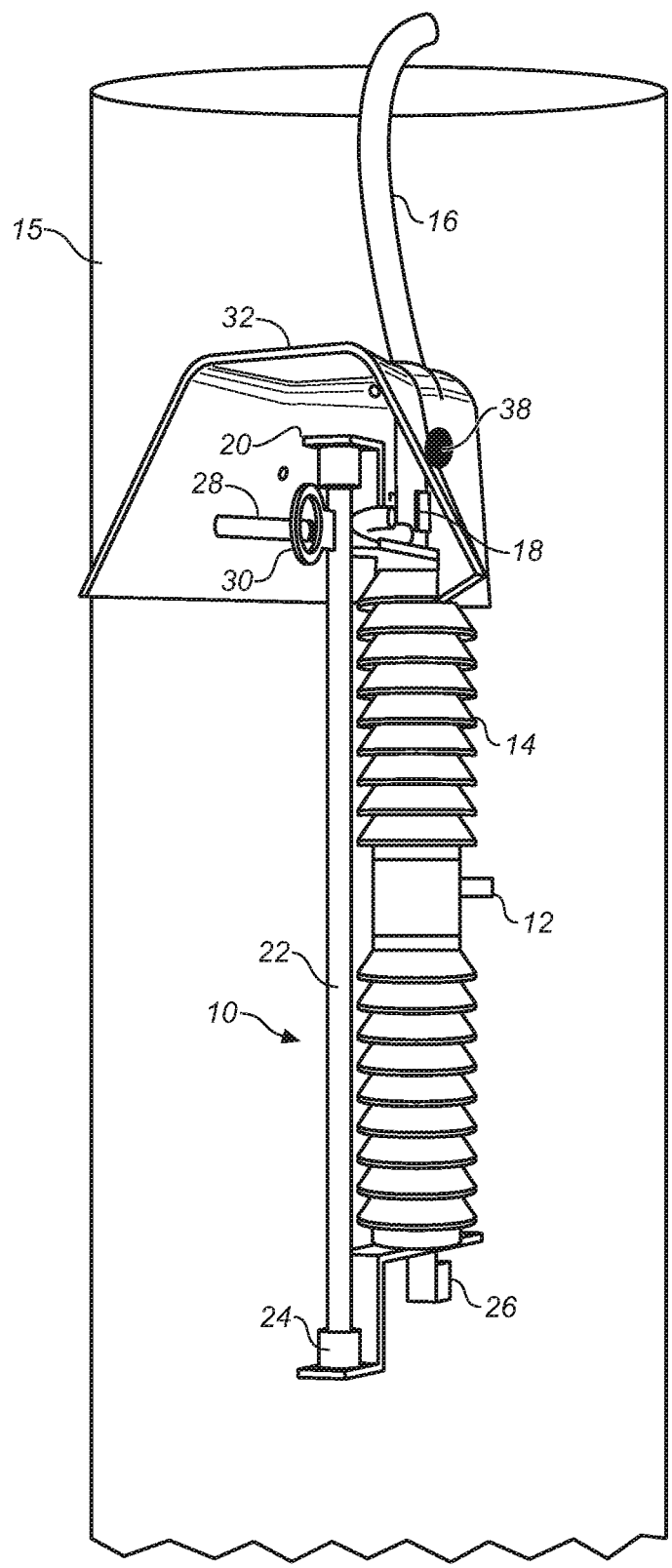
FIG. 2 is a different perspective view of the structure of FIG. 1 connected to a grounded utility pole.

FIGS. 1 and 2 are reproduced from Applicant's U.S. Pat. No. 7,154,034, except for the showing of a melted area due to leakage current, and are used to illustrate a problem that has been reported by linemen in the field using the cover and other types of covers.

FIGS. 1 and 2 illustrate a conventional fuse cutout 10. A mounting bracket 12 secures a ceramic or polymer insulator 14 to a wooden utility pole 15 or crossarm used to support high voltage conductors, such as carrying 3-phase 12KVAC or higher. A "hot" wire 16 is attached to one phase. The wire 16 is substantially vertical and typically tapped off an overhead wire running between utility poles. A metal connector 18 electrically connects the wire 16 to a top contact 20 of a blowable fuse 22. The fuse 22 electrically connects to a pivot joint 24 and a bottom connector 26. The bottom connector 26 is connected to another wire (not shown) which may lead to a transformer or any other electrical device or conductor. Opening or blowing of the fuse 22 disconnects the top contact 20 from the bottom connector 26.

A metal hook assembly 28 is fixed to the connector 18 and is used to temporarily support a load break tool for opening the fuse 22. A metal pull ring 30 is physically and electrically connected to the upper end of the fuse 22. By coupling the load break tool to the hook assembly 28 and pull ring 30 and then pulling down on the load break tool, the fuse 22 may be pulled away to safely open the circuit.

A dielectric cover 32, described in Applicant's U.S. Pat. No. 7,154,034, can be installed by a lineman, using a hot-stick, while the wire 16 is connected and energized, since the cover 32 has a rear vertical slot 34 and top hole 36 for the wire 16 that allows the cover 32 to be slid over the cutout 10 and lowered down onto the cutout 10. The cover 32 prevents wildlife, such as birds and squirrels, from coming into contact with the high voltage conducting portions of the cutout 10.

The narrow slot 34 faces the pole 15 (or crossarm), and the large opening shrouding the hook assembly 28 and pull ring 30 face away from the pole 15 (or crossarm) and cannot be accessed by the wildlife. So the wildlife is protected.

Linemen have reported small melted areas 38 in some covers. The Applicant has concluded that the melted areas 38 are due to prolonged heat from small leakage currents. Such a leakage current typically flows across the outer surface of the cover, leading to localized heating and melting of the cover. The melting may reduce the insulating properties of the cover.

To solve this problem, Applicant provides a double wall of the cover around the energized areas that are most likely to induce the flow of leakage current. The added insulation and air gap between walls prevents such leakage current and melting in the cover.

Figure 3:
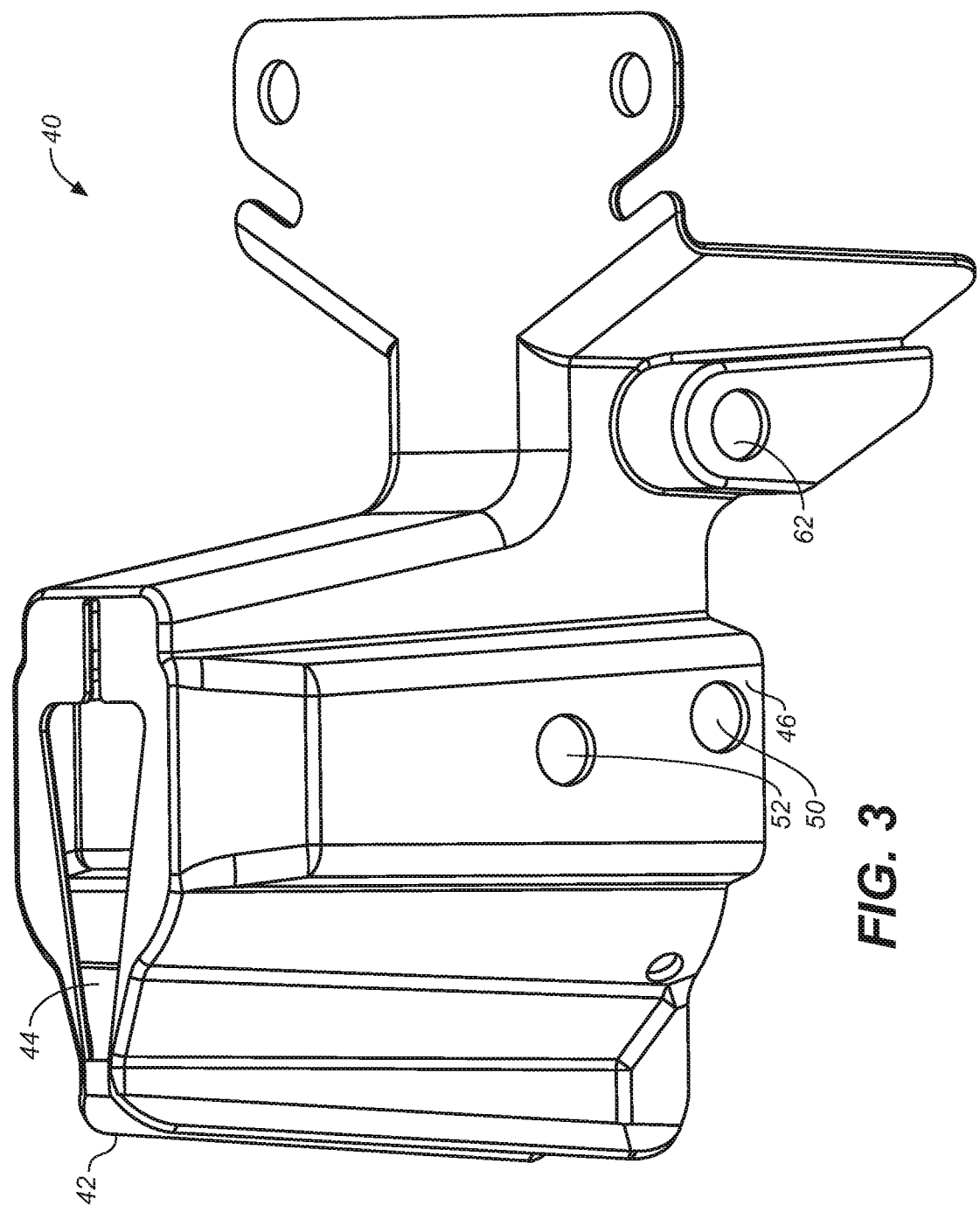
FIG. 3 is a perspective view of a double walled cutout cover in accordance with one embodiment of the present invention.
Figure 4A:
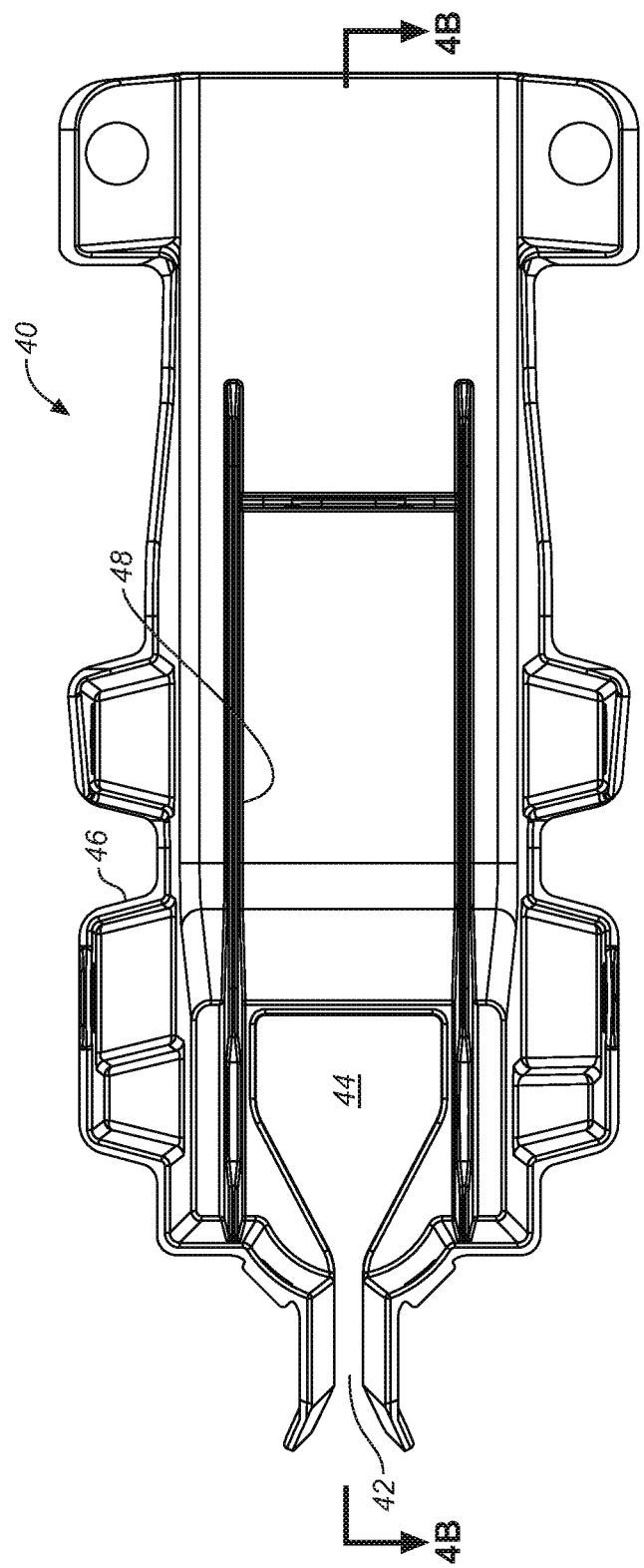
FIG. 4A is a bottom up view of the cover of FIG. 3 showing an inner wall that partially surrounds a high voltage portion of a cutout for preventing leakage currents. A similar double wall may also be added to the cover of FIGS. 1 and 2 to prevent leakage currents.
Figure 5:
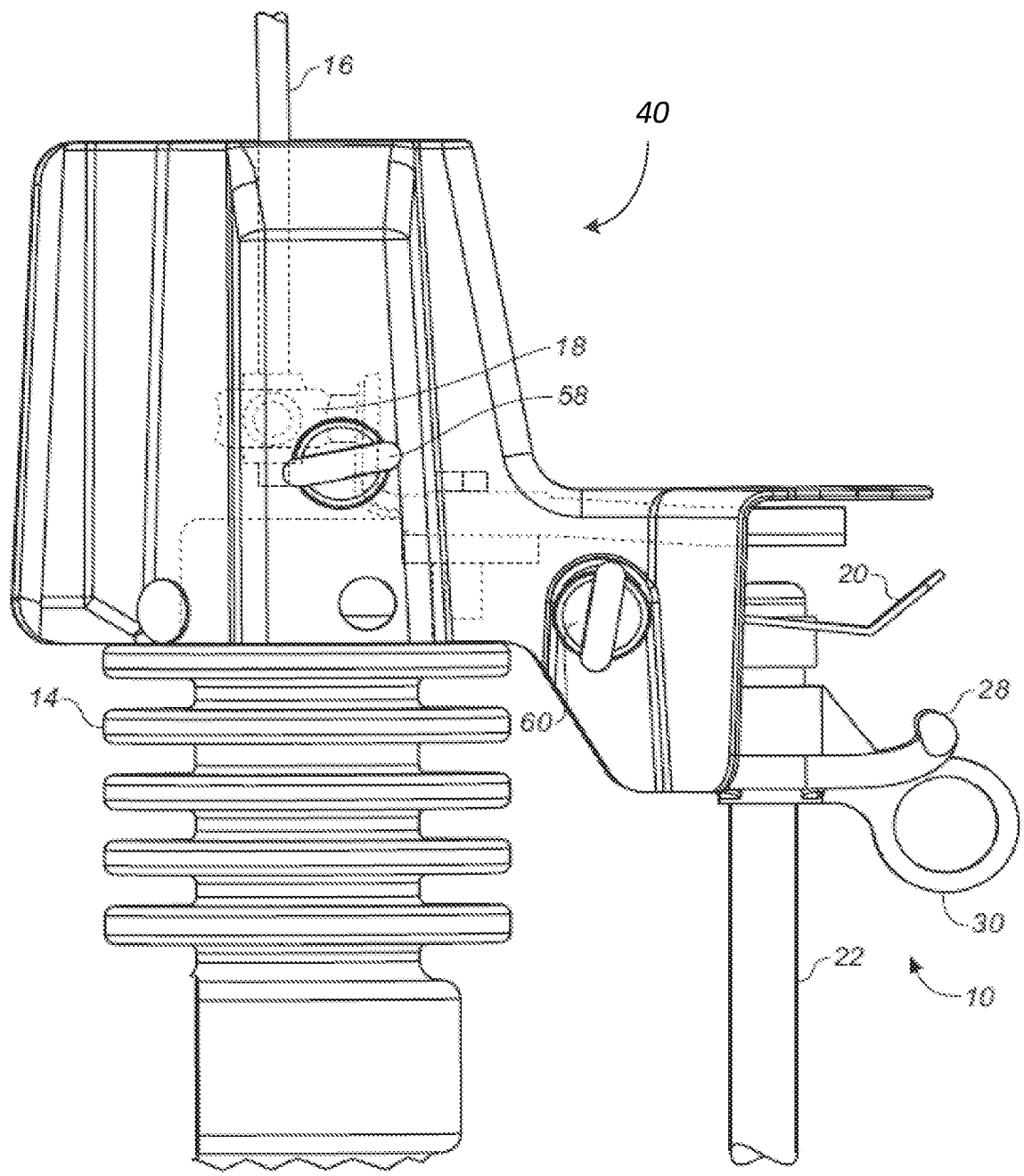
FIG. 5 is a side view of the cutout of FIGS. 1 and 2 with the cutout cover of FIGS. 3 and 4 installed over it.

FIGS. 3-5 illustrate a new cover 40 that includes a section with double walls to prevent leakage current. FIG. 3 is a perspective view of the cover 40, FIG. 4A is a bottom up view of the cover 40 showing the double walls, and FIG. 4B is a bisected view of the cover showing the shape of one of the inner walls. The cover 40 protects wildlife and prevents leakage current using a single molded piece. In another embodiment, the inner walls may be a separate piece bonded to the cover 40.

The cover 40 is formed of a resilient molded dielectric material. The cover 40 is similar to the cover 32 in FIGS. 1 and 2 in that it has a vertical slot 42 in back and a top hole 44 for the wire 16 (FIG. 1) so the cover 40 can be slid over the cutout while the wire 16 is connected and energized. Holes in the cover 40 can be used for grasping with a hot-stick.

The cover 40 has outer walls 46 and inner walls 48 (FIGS. 4A and 4B) with an air gap in-between. In the embodiment of the cover for a cutout, the leakage current is mainly induced by the upper contact assembly of the cutout, so the double walls only need to be formed around the upper contact assembly. In the embodiment shown, the inner walls 48 do not extend below the through hole 50 (FIG. 3) in the cover 40, since the area below the through hole 50 shrouds a top portion of the cutout insulator 14, as shown in FIG. 5, and the hole 50 must not be blocked in order to receive a pin. The inner walls 48 extend down about two-thirds the height of the cover 40.

For covers used with other than cutouts, the double wall area would surround the high voltage parts that are most likely to induce a leakage current.

In the example shown, the inner walls 48 begin at the edge of the cover 40 near the slot 42 and extend to the opening for the hook assembly 28 and the pull ring 30. So the inner walls 48 extend substantially an entire length of the sidewalls of the cover 40 between the slot 42 and the fuse.

FIG. 5 shows a similar cover 40 as semi-transparent while installed over a cutout 10. The inner walls 48 (FIGS. 4A and 4B) primarily shroud the wire connector 18 area and upper contact assembly of the cutout. The inner walls 48 may include openings to allow the retaining pin to pass through the cover 40.

There are no sidewalls near the end of the cover 40, and the roof over the hook assembly 28 and pull ring 30 is substantially flat, so that the hook assembly 28 and pull ring 30 may be accessed through a wide range of angles by a load break tool.

After the cover 40 is in position, pins 58 and 60 are pushed through holes 52 and 62 (FIG. 3), or holes 50 and 62, to keep the cover 40 in place during high wind conditions. The pins 58 and 60 extend under the cutout connector 18 and top contact 20.

Figure 6:
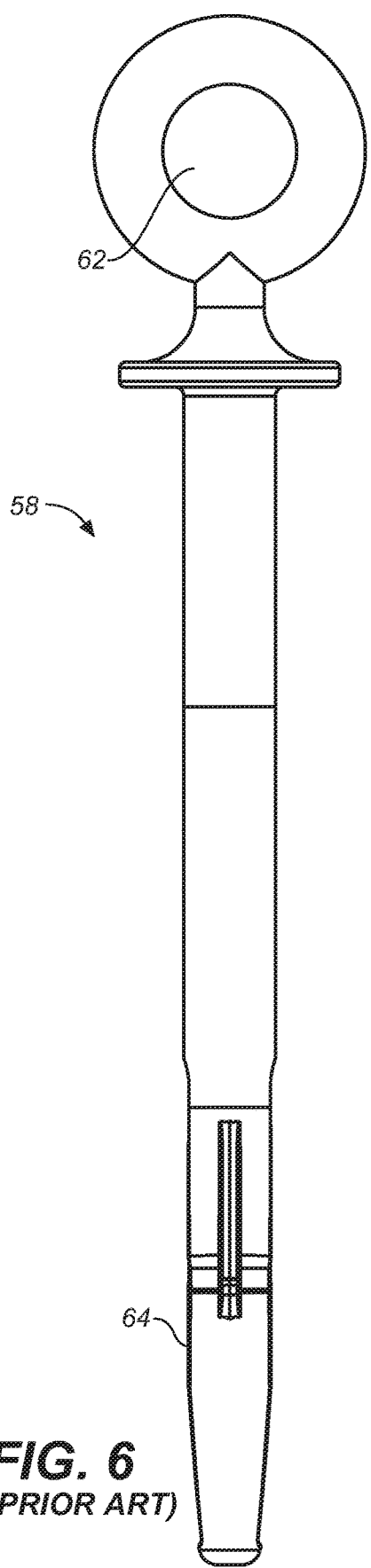
FIG. 6 is a front view and FIG. 7 is a side view of a pin used to secure the cover over the cutout.
Figure 7:
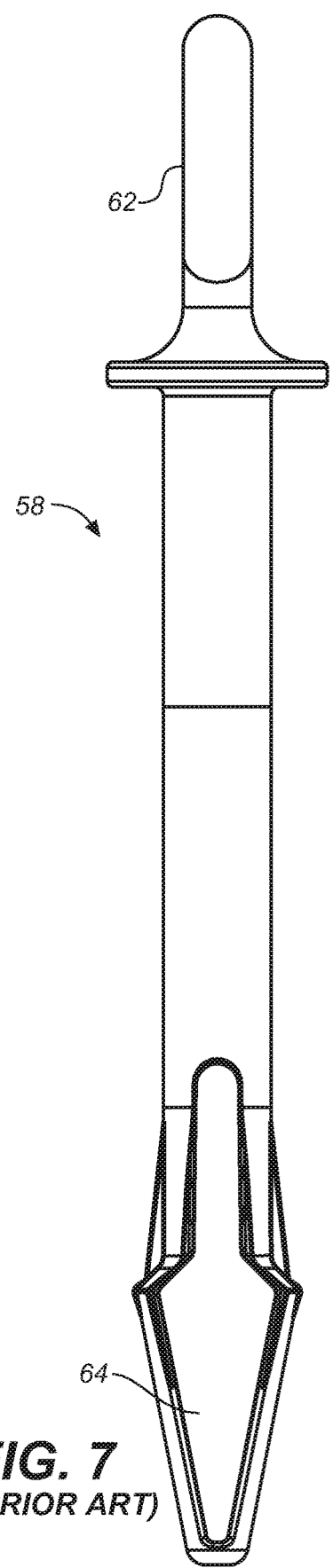

FIGS. 6 and 7 illustrate front and side views of the plastic pin 58. The pin 58 has a ring 62 for grabbing with a hot-stick. A resilient tip 64 enables the pin 58 to be easily pushed through the hole 50, 52, or 62 (FIG. 3), but makes it more difficult to be removed due to its differently sloped sides.

Other types of dielectric covers are installed over high voltage bushings, solid-blade disconnects, lightning arrestors, and insulators to prevent wildlife contacting any high voltage conductors. One such cover covers the high voltage bushing coupling a wire to an internal component of a transformer. Such covers may also have the rear vertical slot and wire hole to enable the cover to be installed while the wire is connected and energized. The slot may resiliently close after a wire passes through it. Accordingly, such covers are also molded to have inner walls and outer walls, separated by an air gap, proximate to the high voltage conductor areas prone to leakage currents.

Since the cover 40 fits closely over the cutout, and takes up very little space, existing packaging for the cutout may also accommodate the cover 40, so they can be sold together.

Having described the invention in detail, those skilled in the art will appreciate that, given the present disclosure, modifications may be made to the invention without departing from the spirit of the inventive concept described herein. Therefore, it is not intended that the scope of the invention be limited to the specific embodiments illustrated and described.

What is claimed is:

1. A wildlife protection system for a high voltage power system comprising:
   a dielectric cover configured to fit over a high voltage conductor to prevent access to the conductor by wildlife, the cover having a top portion when installed over the conductor,
   wherein the cover has outer walls that extend down from the top portion of the cover to at least partially surround the conductor, and
   wherein the cover has inner walls that extend down from the top portion of the cover, the inner walls being separated from the outer walls by an air gap to form portions of the cover with double walls laterally surrounding the conductor.

2. The system of claim 1 wherein the cover is a fuse cutout cover.

3. The system of claim 1 wherein the cover covers a portion of an insulator.

4. The system of claim 1 wherein the cover is a bushing cover.

5. The system of claim 1 wherein the inner walls oppose only a portion of the outer walls.

6. The system of claim 1 wherein the cover is a fuse cutout cover and the cover includes a vertical slot for a wire, and wherein the inner walls extend substantially between the slot and the fuse.

7. The system of claim 1 wherein the cover is installed over a fuse cutout, wherein the cutout comprises:
   an insulator;
   a first connector, supported by the insulator, for a wire carrying a voltage; and
   an openable fuse electrically connected to the first connector,
   wherein the inner walls of the cover at least partially shroud the first connector.

8. The system of claim 1 wherein the inner walls reduce leakage currents across the cover.

9. The system of claim 1 wherein the cover has one or more through holes for retaining pins, and wherein the inner walls do not block the through holes for the retaining pins.

10. The system of claim 1 wherein the inner walls terminate above a bottom edge of the cover.

11. The system of claim 1 wherein the cover is positioned to cover at least a top of an insulator supported by a utility pole or a crossarm.

12. The system of claim 1 wherein the cover has a slot for receiving a wire to allow the cover to be installed while the wire is energized.

13. The system of claim 12 wherein the slot is substantially facing a utility pole or crossarm.

14. The system of claim 1 wherein the cover is packaged in the same package as a fuse cutout while the cover is fitted over the cutout.

15. A method for using a wildlife protection system for a high voltage power system comprising:

provoding a dielectric cover, the cover having a slot for receiving a wire, the dielectric cover being configured to fit over a high voltage connector for the wire to prevent access to the connector by wildlife, the cover having a top portion when installed over the connector, wherein the cover has outer walls that extend down from the top portion of the cover to at least partially surround the connector, and wherein the cover has inner walls that extend down from the top portion of the cover, the inner walls being separated from the outer walls by an air gap to form portions of the cover with double walls laterally surrounding the connector; and fitting the cover over the wire to at least shroud the connector for the wire.

16. The method of claim 15 wherein the cover is a fuse cutout cover.

17. The method of claim 15 wherein the cover covers a portion of an insulator.

18. The method of claim 15 wherein the cover is a bushing cover.

19. The method of claim 15 wherein the cover includes one or more through holes in it for receiving one or more retaining pins, the method further comprising pushing one or more retaining pins through the one or more holes to secure the cover in place over the cover.

20. The method of claim 19 wherein the inner walls do not block the holes for receiving the one or more retaining pins.

* * * * *